US008793699B2

(12) United States Patent
Errickson et al.

(10) Patent No.: US 8,793,699 B2
(45) Date of Patent: Jul. 29, 2014

(54) NEGATING INITIATIVE FOR SELECT ENTRIES FROM A SHARED, STRICTLY FIFO INITIATIVE QUEUE

(75) Inventors: Richard K. Errickson, Poughkeepsie, NY (US); Geoffrey A. Crew, Lagrangeville, NY (US); Welela Haileselaissie, Poughkeepsie, NY (US); Robert M. Whalen, Jr., Tivoli, NY (US)

(73) Assignee: International Business Machines Corporation, Armonk, NY (US)

( * ) Notice: Subject to any disclaimer, the term of this patent is extended or adjusted under 35 U.S.C. 154(b) by 1026 days.

(21) Appl. No.: 12/051,628

(22) Filed: Mar. 19, 2008

(65) Prior Publication Data

US 2009/0217270 A1 Aug. 27, 2009

Related U.S. Application Data

(60) Provisional application No. 61/031,315, filed on Feb. 25, 2008.

(51) Int. Cl.
*G06F 9/46* (2006.01)
*G06F 9/54* (2006.01)

(52) U.S. Cl.
CPC .................................. *G06F 9/546* (2013.01)
USPC ...................................................... 718/107

(58) Field of Classification Search
None
See application file for complete search history.

(56) References Cited

U.S. PATENT DOCUMENTS

| | | | |
|---|---|---|---|
| 3,643,227 A | 2/1972 | Smith et al. | |
| 4,993,014 A | 2/1991 | Gordon | |
| 5,170,472 A | 12/1992 | Cwiakala et al. | |
| 5,339,413 A | 8/1994 | Koval et al. | |
| 5,343,867 A | 9/1994 | Shankar | |
| 5,388,266 A | 2/1995 | Frey et al. | |
| 5,452,443 A | 9/1995 | Oyamada et al. | |
| 5,524,212 A | 6/1996 | Somani et al. | |
| 5,764,641 A * | 6/1998 | Lin | 370/412 |
| 5,777,987 A | 7/1998 | Adams et al. | |
| 6,018,515 A * | 1/2000 | Sorber | 370/229 |
| 6,073,181 A | 6/2000 | Holland et al. | |
| 6,181,677 B1 | 1/2001 | Valli et al. | |
| 6,185,629 B1 | 2/2001 | Simpson et al. | |
| 6,289,386 B1 | 9/2001 | Vangemert | |

(Continued)

OTHER PUBLICATIONS

Jeong et al.; A study on TCP Buffer Management Algorithim for Improvement on Network Performance in Grid Environment; Jun. 6-9, 2004 pp. 281-288.

(Continued)

*Primary Examiner* — Robert Fennema
*Assistant Examiner* — John Lindlof
(74) *Attorney, Agent, or Firm* — Cantor Colburn LLP; Steven Chiu

(57) ABSTRACT

A computer program product, apparatus and method for negating initiative for select entries from a shared, strictly FIFO initiative queue in a multi-tasking multi-processor environment. An exemplary embodiment includes a computer program product for negating initiative for select entries from a shared initiative queue in a multi-tasking multi-processor environment, the computer program product including a tangible storage medium readable by a processing circuit and storing instructions for execution by the processing circuit for performing a method including identifying an element within the environment that has failed and recovered, not removing the element from the shared initiative queue and entering a boundary element entry into the shared initiative queue.

17 Claims, 7 Drawing Sheets

(56) References Cited

U.S. PATENT DOCUMENTS

| | | |
|---|---|---|
| 6,363,457 B1 | 3/2002 | Sundberg |
| 6,483,804 B1 | 11/2002 | Muller et al. |
| 6,507,567 B1 | 1/2003 | Willars |
| 6,715,055 B1 | 3/2004 | Hughes |
| 6,741,552 B1 | 5/2004 | McCrosky et al. |
| 6,862,609 B2 | 3/2005 | Merkey |
| 6,993,032 B1 | 1/2006 | Dammann et al. |
| 7,093,024 B2 | 8/2006 | Craddock et al. |
| 7,200,704 B2 | 4/2007 | Njoku et al. |
| 7,283,473 B2 | 10/2007 | Arndt et al. |
| 7,290,077 B2 | 10/2007 | Gregg et al. |
| 7,366,813 B2 | 4/2008 | Gregg et al. |
| 7,444,641 B1 | 10/2008 | Diepstraten et al. |
| 7,467,402 B2 | 12/2008 | Pennington et al. |
| 7,602,774 B1 | 10/2009 | Sundaresan et al. |
| 7,613,183 B1 | 11/2009 | Brewer et al. |
| 2001/0014954 A1 | 8/2001 | Purcell et al. |
| 2001/0030943 A1 | 10/2001 | Gregg et al. |
| 2002/0091826 A1 | 7/2002 | Comeau et al. |
| 2002/0107903 A1 | 8/2002 | Richter et al. |
| 2002/0194245 A1 | 12/2002 | Simpson et al. |
| 2003/0005039 A1 | 1/2003 | Craddock et al. |
| 2003/0018828 A1 | 1/2003 | Craddock et al. |
| 2003/0061379 A1 | 3/2003 | Craddock et al. |
| 2004/0123068 A1 | 6/2004 | Hashimoto |
| 2004/0154007 A1 | 8/2004 | Koizumi et al. |
| 2004/0202189 A1 | 10/2004 | Arndt et al. |
| 2004/0221070 A1 | 11/2004 | Ortega, III et al. |
| 2005/0018669 A1 | 1/2005 | Arndt et al. |
| 2005/0060374 A1* | 3/2005 | Phillips .................. 709/206 |
| 2005/0060445 A1 | 3/2005 | Beukema et al. |
| 2005/0080933 A1 | 4/2005 | Herring |
| 2005/0120237 A1 | 6/2005 | Roux et al. |
| 2005/0144313 A1 | 6/2005 | Arndt et al. |
| 2006/0048214 A1 | 3/2006 | Pennington et al. |
| 2006/0176167 A1 | 8/2006 | Dohrmann |
| 2006/0230185 A1 | 10/2006 | Errickson et al. |
| 2006/0230209 A1 | 10/2006 | Gregg et al. |
| 2006/0230219 A1 | 10/2006 | Njoku et al. |
| 2007/0239963 A1 | 10/2007 | Yao et al. |
| 2007/0245050 A1 | 10/2007 | Gregg et al. |
| 2008/0028116 A1 | 1/2008 | Gregg et al. |
| 2008/0109891 A1 | 5/2008 | Greenwald et al. |
| 2008/0196041 A1 | 8/2008 | Gregg et al. |
| 2009/0019312 A1 | 1/2009 | Kulkarni et al. |
| 2009/0094603 A1 | 4/2009 | Hiltgen et al. |
| 2009/0217238 A1 | 8/2009 | Errickson et al. |

OTHER PUBLICATIONS

Non-Final Office Action dated Jun. 23, 2010 for U.S. Appl. No. 12/036,986.
Non-Final Office Action dated Jan. 29, 2010 for U.S. Appl. No. 12/036,979.
Notice of Allowance dated Jun. 23, 2010 for U.S. Appl. No. 12/036,979.
Non-Final Office Action dated Oct. 1, 2010 ffor U.S. Appl. No. 12/037,046.
Non-Final Office Action dated May 17, 2010 for U.S. Appl. No. 12/037,046.
Office Action made Final dated Oct. 6, 2010 for U.S. Appl. No. 12/037,048.
Non-Final Office Action dated Apr. 9, 2010 for U.S. Appl. No. 12/037,048.
Office Action Made Final dated Aug. 12, 2010 for U.S. Appl. No. 12/051,634.
Non-Final Office Action dated Mar. 22, 2010 for U.S. Appl. No. 12/051,634.
Non-Final Office Action dated May 13, 2010 for U.S. Appl. No. 12/051,631.
Non-Final Office Action dated Jun. 1, 2010 for U.S. Appl. No. 12/051,630.
Huang et al., InfiniBand Support in Xen Virtual Machine Environmant, Technical Report, OSU-CISRC-10/05-TR63, Oct. 2005.
"Infiniband Architecture Specification Volume 1", Release 1.0.a, Jun. 19, 2001, pp. 40, 71, 193-194, 366-370, 665-667.
Wu et al., "Design of an InfiniBand Emulator over Myrinet: Challenges, Implementation, and Performance Evaluation", Technical Report, OSU-CISRC-2/01-TR03, 2003.
Non-Final Offica Action dated Mar. 22, 2011 for U.S. Appl. No. 12/036,983.
Advisory Action dated Feb. 16, 2011 for U.S. Appl. No. 12/036,986.
Office Action made Final dated Dec. 8, 2010 for U.S. Appl. No. 12/036,986.
Notice of Allowance dated Feb. 7, 2011 for U.S. Appl. No. 12/036,979.
Notice of Allowance dated Apr. 22, 2011 for U.S. Appl. No. 12/037,046.
Notice of Allowance dated Jan. 11, 2011 for U.S. Appl. No. 12/037,048.
Notice of Allowance dated Oct. 15, 2010 for U.S. Appl. No. 12/051,631.
Final Office dated Nov. 12, 2010 for U.S. Appl. No. 12/051,630.
Non-Final Office Action dated Nov. 14, 2011 for U.S. Appl. No. 12/058,034.
Non-Final Office Action dated Feb. 8, 2012 for U.S. Appl. No. 12/058,054.
Non-Final Office Action dated Dec. 1, 2011 for U.S. Appl. No. 12/051,634.
Non-Final Office Action dated Jan. 9, 2012 for U.S. Appl. No. 12/051,630.
Notice of Allowance dated Mar. 9, 2012 for U.S. Appl. No. 12/058,034.
Final Office Action for U.S. Appl. No. 12/051,634—Dated May 9, 2012.

* cited by examiner

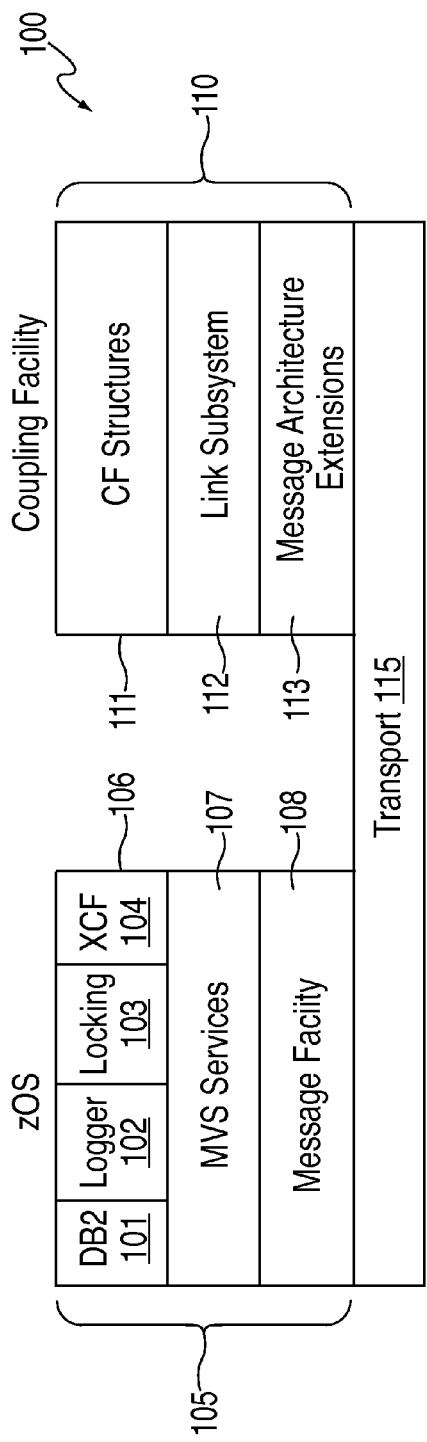
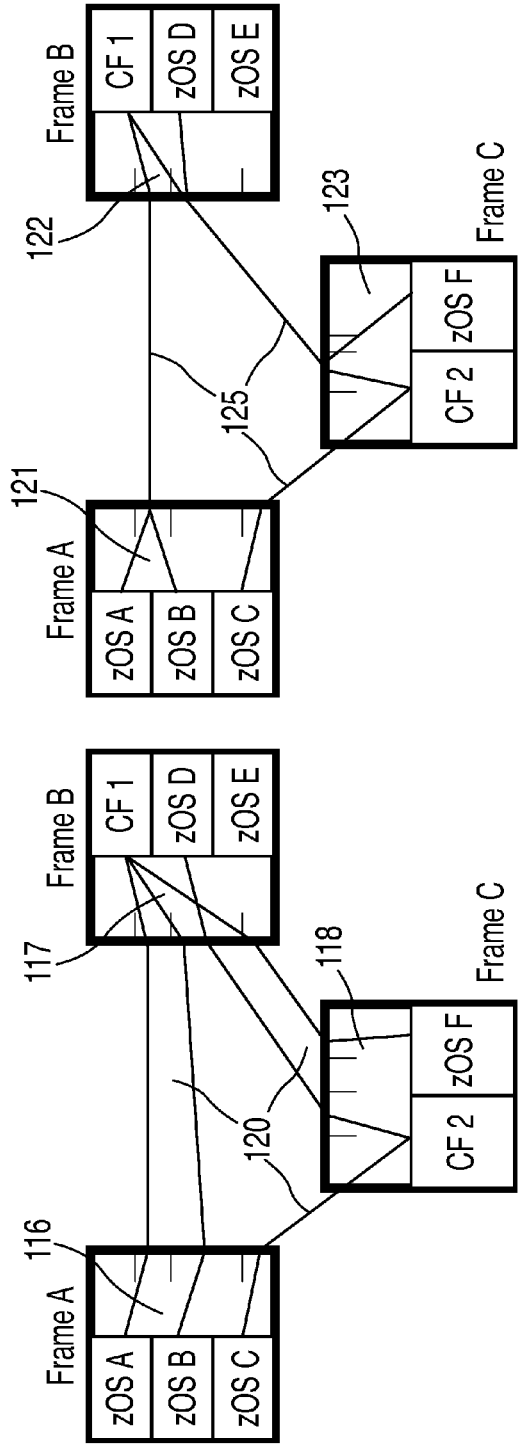
FIG. 1A
FIG. 1B
FIG. 1C

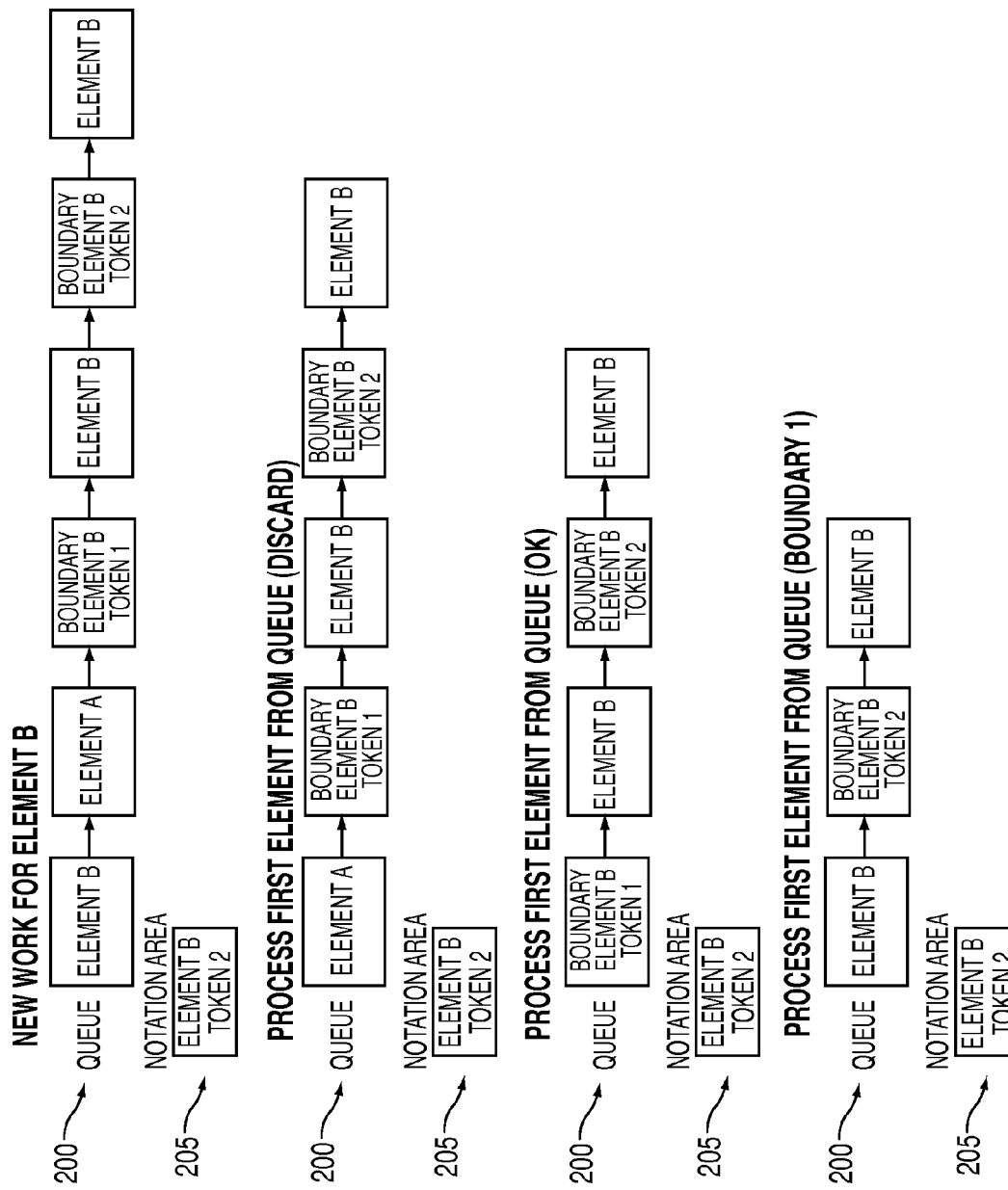

US 8,793,699 B2

NEGATING INITIATIVE FOR SELECT ENTRIES FROM A SHARED, STRICTLY FIFO INITIATIVE QUEUE

Priority based on U.S. Provisional Patent Application, Ser. No. 61/031,315, filed Feb. 25, 2008, and entitled "MULTI-TASKING MULTI-PROCESSOR ENVIRONMENTS OVER INFINIBAND" is claimed, the entire contents of which is incorporated by reference in its entirety.

BACKGROUND OF THE INVENTION

1. Field of Invention

The present disclosure relates generally to initiative queues in multi-tasking multi-processor environments, and in particular, to negating initiative for select entries from a shared, strictly FIFO initiative queue in a multi-tasking multi-processor environment.

2. Description of Background

When an element within a system fails and is recovered, any work for that element which was queued before the recovery event must not be processed after the recovery event. When each element has its own dedicated queue, the entire queue can be reset as part of the recovery event. When the queue has the capability for entries to be removed from anywhere within the queue, queue entries related to the effected element can be removed from the queue as part of the recovery event. However, when the queue contains entries for multiple elements and the queue is maintained as a strictly FIFO queue, affected entries cannot be selectively removed from the queue, nor can the entire queue be reset. In some cases, it may be possible to drain the queue by removing all entries from the queue, discarding the entries from the affected elements and re-queuing the unaffected entries in order, but if another processor adds entries to the queue while this action is happening, the ordering of the entries within the queue is lost.

BRIEF SUMMARY OF THE INVENTION

An exemplary embodiment includes a computer program product for negating initiative for select entries from a shared initiative queue in a multi-tasking multi-processor environment, the computer program product including a tangible storage medium readable by a processing circuit and storing instructions for execution by the processing circuit for performing a method including identifying an element within the environment that has failed and recovered, not removing the entries belonging to the element from the shared initiative queue, but adding a boundary queue entry into the shared initiative queue.

Another exemplary embodiment includes an apparatus for negating initiative for select entries from a shared initiative queue in a multi-tasking multi-processor environment, the system including a processor, a strictly FIFO initiative queue, a process for recovering a failed element within the strictly FIFO initiative queue, the process of identifying an element within the environment that has failed and recovered, not removing the entries belonging to the failing element from the shared initiative queue, but adding a boundary queue entry into the shared initiative queue.

A further exemplary embodiment includes a method for negating initiative for select entries from a shared initiative queue in a multi-tasking multi-processor environment, the method including identifying an element within the environment that has failed and recovered, not removing the entries belonging to the failing element from the shared initiative queue, but adding a boundary queue entry into the shared initiative queue.

Other articles of manufacture, apparatuses, and/or methods according to embodiments will be or become apparent to one with skill in the art upon review of the following drawings and detailed description. It is intended that all such additional articles of manufacture, apparatuses, and/or methods be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1A illustrates an exemplary embodiment of a multi-tasking multi-processor Infiniband system;

FIG. 1B illustrates an example of a multi-tasking multi-processor environment;

FIG. 1C illustrates an example of a multi-tasking multi-processor environment in accordance with an exemplary embodiment;

FIGS. 2A-2C illustrate block diagrams of boundary queue entries in accordance with exemplary embodiments.

The detailed description explains the preferred embodiments of the invention, together with advantages and features, by way of example with reference to the drawings.

DETAILED DESCRIPTION OF THE INVENTION

In accordance with an aspect of the present invention, the systems and methods described herein implement a new type of queue entry, which is called a boundary entry. When an element is recovered, a boundary entry for the element is added to the queue. In addition, a notation is made for that element that queue entries for the element are to be discarded. When the boundary queue element is removed from the queue, this notation is removed, and subsequent entries for the element may be processed, which can be done so that any number of processors may be adding entries to or removing entries from the queue at any time. The queue itself is a strictly ordered FIFO, which is non-blocking. Additionally, the boundary entry and the notation use a token, so that multiple recovery events may be processed for the same element.

Figure 1D:
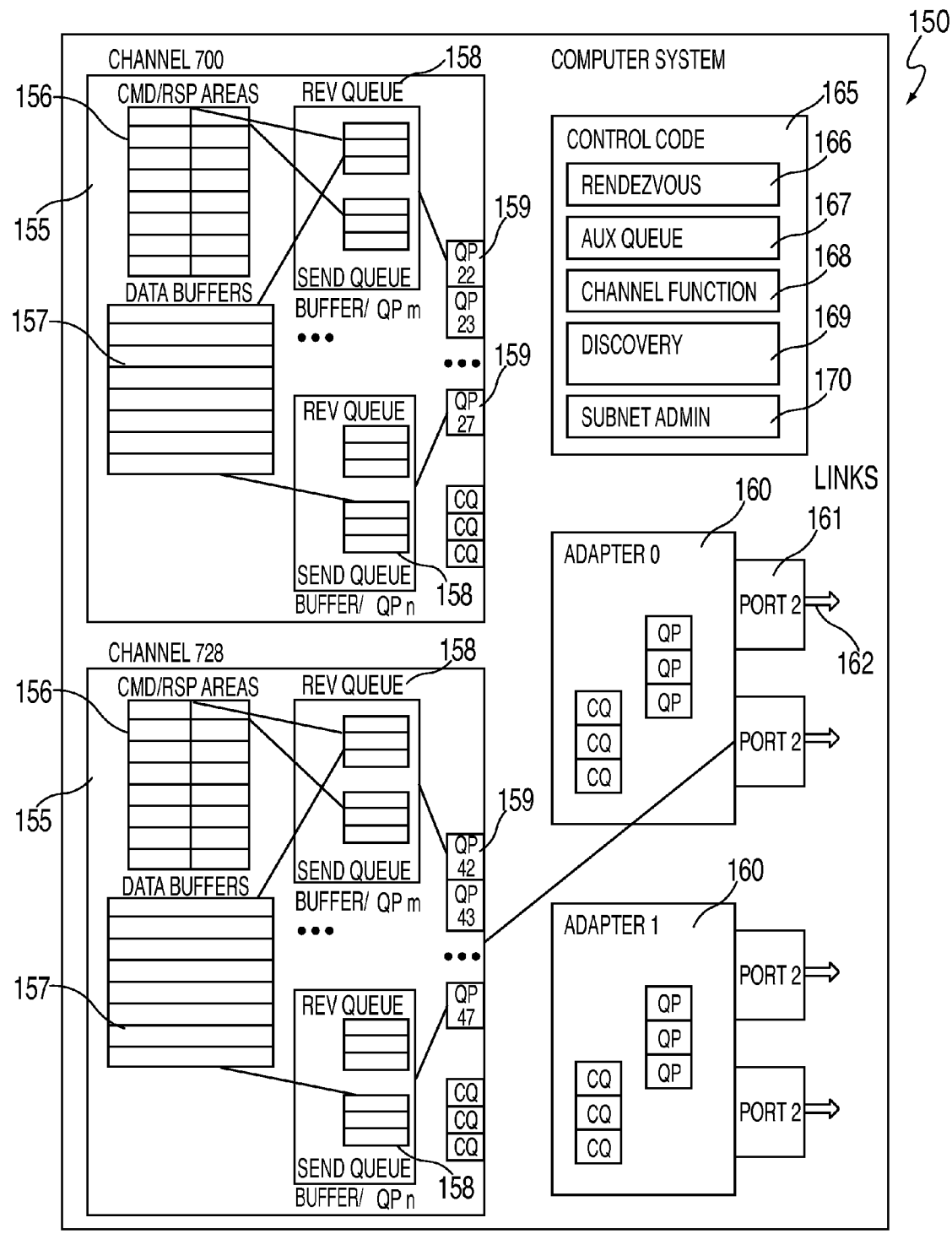
FIG. 1D illustrates an example of a multi-tasking multi-processor environment in accordance with an exemplary embodiment.

FIG. 1A illustrates an exemplary embodiment of a multi-tasking multi-processor Infiniband system 100. The system 100 can include an operating system 105 (e.g., IBM zOS) having a top layer including a relational database 101 a logging facility 102, a locking facility 103 and a cross system coupling facility (XCF). The operating system 105 can further include a multiple virtual storage (MVS) services layer 107 and a message facility layer 108. The system 100 can further include a coupling facility (CF) 110 having a CF structures layer 111, a link subsystem 112 and a message architecture extensions layer 113. In an exemplary embodiment, a transport layer 115 is disposed between and couples the operating system 105 and the CF 110. In an exemplary implementation, the transport layer 115 is supported by Infiniband. FIG. 1B illustrates an example of a multi-tasking multi-processor environment. The example shows three mainframes A, B, C connected into a two different Parallel Sysplex environments using the previous generation of coupling transports. zOS A, zOS B and zOS F are all tied together through a Coupling Facility (CF1). zOS C and zOS D are tied together through CF2. Meanwhile zOS E is a stand alone operating system. In this configuration separate channels are connected through separate adapters in the separate frames. It is appreciated that multiple internal channels 116, 117, 118 include separate external connections 120. FIG. 1C illustrates an example of a multi-tasking multi-processor environment in accordance with an exemplary embodiment. In this example, multiple internal channels 121, 122, 123 share the same physical connection 125. FIG. 1D illustrates an example of a multi-tasking multi-processor environment 150 in accordance with an exemplary embodiment. The environment 150 can include one or more channels 155, each channel including command/response areas 156, data buffers 157, receive/send queues 158 and adapters 160 for mapping the channels 155 to ports 161 and ultimately communication links 162, as discussed further herein. The channels 155 can further include queue pairs 159 as discussed further herein. The system 150 can further include control code 165 having functions including but not limited to: rendezvous 166, auxiliary queue 167, channel 168, discovery 169 and subnet administrator 170.

Figure 2A:
Figure 2C:
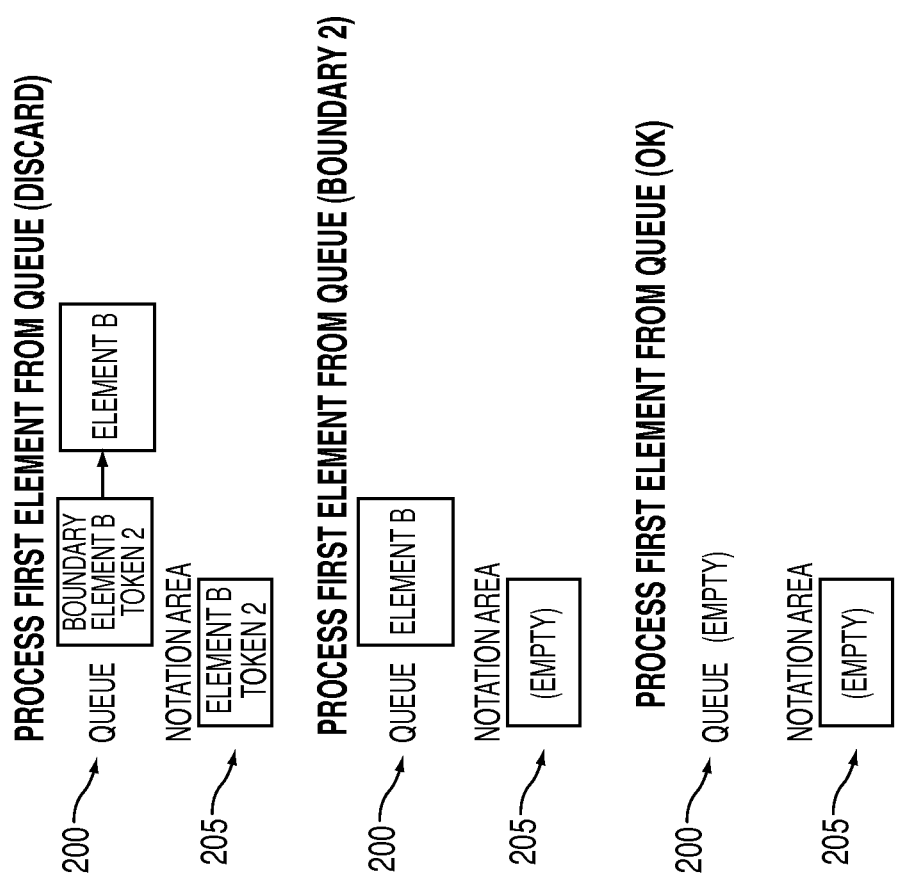

FIGS. 2A-2C illustrate block diagrams of boundary queue entries in accordance with exemplary embodiments. In FIG. 2A, a queue 200 includes an initial state including entries for elements A, B, A. The notation area 205 is empty. The queue then undergoes a recovery for element B, in which the notation area 205 indicates that element B recovery is active, and associated with token 1. New work then enters the queue 200 for element B. The notation area 205 remains set for Element B Token 1. The queue then undergoes recovery for element B once again, and the notation area 205 for Element B is now set to Token 2. The first Element A is then processed from the queue 200 and the notation area 205 for Element B remains set to Token 2. In FIG. 2B, new work for Element B is added to the queue 200, and the notations area 205 for Element B remains set to Token 2. The first Element B is then processed and discarded, and the notation area for Element B remains set to Token 2. The next Element A is then processed, and the notation area 205 for Element B remains set to Token 2. The next element that is processed is Boundary Element B token 1. In this case the notation area 205 for Element B still remains set to Token 2. IN FIG. 2C, the next Element B is discarded and the notation area 205 for Element B remains set to token 2. The next element that is processed is the boundary element for Element B Token 2, in which case the notation area 205 for element B is reset, indicating that there is no recovery for Element B active. The next Element B is then processed, since there is no boundary queue element for Element B pending. It is therefore appreciated that the failed Element B can be recovered without resetting the queue 200.

Figure 3:
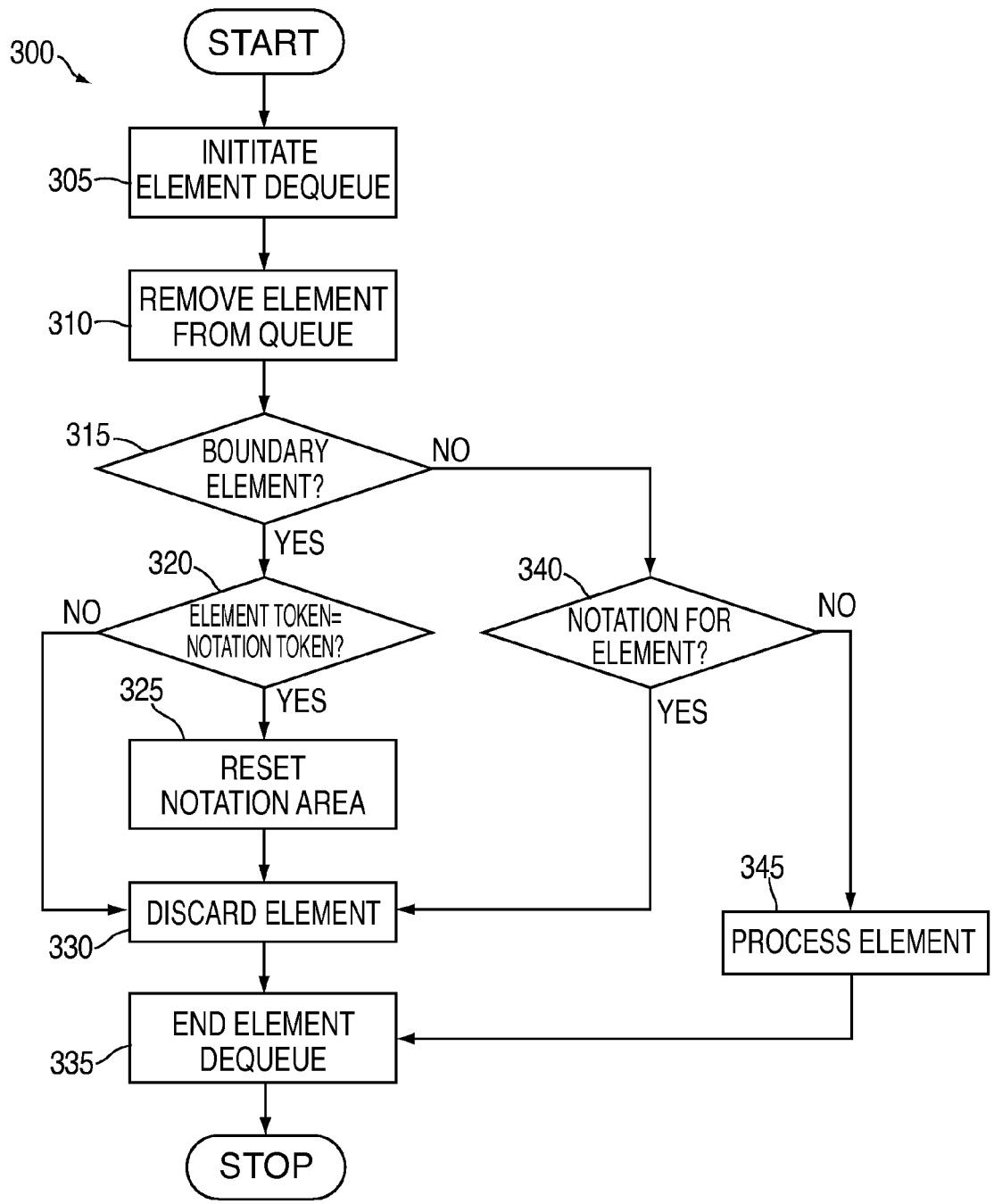
FIG. 3 illustrates a flow cart for a method of negating initiative for select entries from a shared strictly FIFO initiative queue in accordance with exemplary embodiments.

FIG. 3 illustrates a flow cart for a method 300 of negating initiative for select entries from a shared strictly FIFO initiative queue in accordance with exemplary embodiments. This flow chart limits itself to the processing of elements removed from the queue. Whenever there are entries on the queue in system 100, at block 305, the system 100 initiates an element dequeue. As described above, the first entry is removed from the queue at block 310. At block 315, the system 100 determines whether the element removed is a boundary element. If the element is not a boundary element, then at block 340, the system determines if there is notation for that element. If there is no notation for the failed element, then the element is processed at block 345 and the element dequeue ends at block 335. If at block 340, the system 100 determines that there is a notation for the element, then at block 330, the entry which is associated with the failed element is discarded and the element dequeue ends at block 335.

Returning to block 315, if it is determined that the entry is a boundary element, then at block 320, the system compares the entry token with the notation token. If the boundary element token is not equal to the notation token at block 320, then at block 330, the system 100 discards the failed element, and at block 335 the element dequeue ends. If at block 320, the system determines that the boundary element token is equal to the notation token, then at block 325, the system resets the notation area for the element, the boundary element is discarded at block 330 and the element dequeue ends at block 535.

Technical effects of exemplary embodiments include the ability to selectively remove from a strictly FIFO queue and reset the strictly FIFO queue in multi-tasking multi-processor environments.

Figure 4:
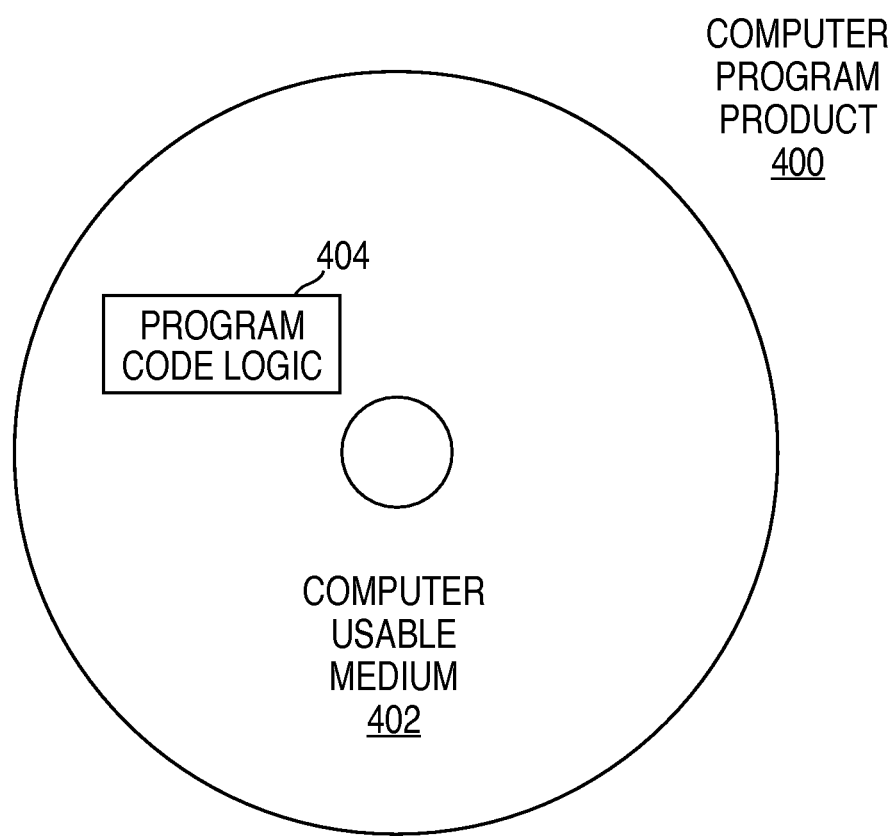
FIG. 4 depicts one embodiment of an article of manufacture incorporating one or more aspects of the present invention.

As described above, embodiments can be embodied in the form of computer-implemented processes and apparatuses for practicing those processes. In exemplary embodiments, the invention is embodied in computer program code executed by one or more network elements. Embodiments include a computer program product 400 as depicted in FIG. 4 on a computer usable medium 402 with computer program code logic 404 containing instructions embodied in tangible media as an article of manufacture. Exemplary articles of manufacture for computer usable medium 402 may include floppy diskettes, CD-ROMs, hard drives, universal serial bus (USB) flash drives, or any other computer-readable storage medium, wherein, when the computer program code logic 404 is loaded into and executed by a computer, the computer becomes an apparatus for practicing the invention. Embodiments include computer program code logic 404, for example, whether stored in a storage medium, loaded into and/or executed by a computer, or transmitted over some transmission medium, such as over electrical wiring or cabling, through fiber optics, or via electromagnetic radiation, wherein, when the computer program code logic 404 is loaded into and executed by a computer, the computer becomes an apparatus for practicing the invention. When implemented on a general-purpose microprocessor, the computer program code logic 404 segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A computer program product for negating initiative for select entries from a shared initiative first-in first-out (FIFO) queue in a multi-tasking multi-processor environment, the computer program product comprising:
 a non-transitory storage medium readable by a processing circuit and storing instructions for execution by the processing circuit for performing a method comprising:
  maintaining a plurality of entries in the shared initiative FIFO queue including a first entry corresponding to an element in the environment;
  determining that the element within the environment has failed and recovered;
  maintaining a location of the first entry corresponding to the element in the shared initiative FIFO queue;
  inserting a distinct boundary element entry comprising a notation as an additional entry into the shared initiative FIFO queue based on determining that the element has failed and recovered;
  inserting a second entry corresponding to the element in the shared initiative FIFO queue;
  setting the notation in a notation area, the notation indicating that the first entry is to be discarded;
  processing the plurality of entries in the shared initiative FIFO queue on a first-in, first-out basis;
  based on the first entry being advanced to an output of the shared initiative FIFO queue, discarding the first entry while the notation is set in the notation area;
  in response to the boundary element entry advancing to the output of the shared initiative FIFO queue, resetting the notation in the notation area; and
  processing the second entry based on the second entry advancing to the output of the shared initiative FIFO queue.

2. The computer program product as claimed in claim 1 further comprising setting a boundary element token equal to a notation token.

3. The computer program product as claimed in claim 2 wherein the method further comprises resetting a notation area in the shared initiative queue.

4. The computer program product as claimed in claim 1 wherein the method further comprises, in response to the boundary element entry advancing to the output of the shared initiative FIFO queue, determining whether a boundary element token is equal to a notation token; and
 resetting the notation in the notation area based on determining that the boundary element token is equal to the notation token.

5. The computer program product as claimed in claim 1, further comprising:
 determining whether an entry advanced to the output of the shared initiative FIFO queue is the boundary element; and
 based on determining that the entry advanced to the output of the shared initiative FIFO queue is not the boundary element, determining whether the entry includes a notation for the boundary element.

6. The computer program product as claimed in claim 5 wherein the method further comprises in response to an identification of the notation for the boundary element in the entry, discarding the entry.

7. The computer program product as claimed in claim 6 wherein the method further comprises in response to an absence of the notation for the boundary element, processing the element.

8. A system for negating initiative for select entries from a shared initiative queue in a multi-tasking multi-processor environment, the system comprising:
 a processor;
 a strictly first-in, first-out (FIFO) shared initiative queue comprising a plurality of entries including a first entry corresponding to an element within the environment;
 a process residing in the processor and configured for recovering a failed element within the strictly FIFO initiative queue, the process comprising:
  determining that the element within the environment that has failed and recovered;
  maintaining a position of the first entry corresponding to the element in the strictly FIFO shared initiative queue;
  inserting a distinct boundary element entry comprising a notation as an additional entry into the strictly FIFO shared initiative queue, at an input end of the strictly FIFO shared initiative queue, responsive to determining that the element has failed and recovered;
  setting the notation in a notation area, the notation indicating that work entries associated with the boundary element entry are to be discarded;
  inserting a second entry corresponding to the element in the shared initiative FIFO queue at the input end of the strictly FIFO shared initiative queue;
  processing the plurality of entries in the strictly FIFO shared initiative queue from the output end of the strictly FIFO shared initiative queue, and discarding the work entries, including the first entry, while the notation is set in the notation area;
  in response to encountering the boundary element entry, resetting the notation in the notation area; and
  processing work entries in the strictly FIFO shared initiative queue encountered subsequent to the boundary element entry.

9. The system as claimed in claim 8 wherein the process further performs:
 setting a boundary element token equal to a notation token;
 resetting a notation area in the shared initiative queue; and
 discarding the element.

10. The system as claimed in claim 8 wherein the process further performs:
 in response to identifying a boundary element entry in the shared initiative queue setting a boundary element token equal to a notation token and discarding the failed element;
 in response to the lack of a boundary element in the shared initiative queue, identifying a notation for the boundary element; and
 in response to an identification of a notation for the boundary element, discarding the element.

11. A method for negating initiative for select entries from a shared initiative queue in a multi-tasking multi-processor environment, the method comprising:
 maintaining a plurality of entries in the shared initiative queue including a first entry corresponding to an element in the environment;
 determining that the element within the environment has failed and recovered;
 maintaining a position of the first entry corresponding to the element in the shared initiative queue;

inserting a distinct boundary element entry comprising a notation as an additional entry into the shared initiative queue responsive to determining that the element has failed and recovered;

setting the notation in a notation area, the notation indicating that work entries associated with the boundary element entry are to be discarded;

inserting a second entry corresponding to the element into the shared initiative queue;

discarding the work entries, including the first entry, based on the notation being set in the notation area;

in response to encountering the boundary element entry, resetting the notation in the notation area; and processing work entries, including the second entry, encountered subsequent to the boundary element entry.

12. The method as claimed in claim 11 further comprising setting a boundary element token equal to a notation token.

13. The method as claimed in claim 12 further comprising: resetting a notation area in the shared initiative queue; and discarding the element.

14. The method as claimed in claim 11 further comprising in response to identifying a boundary element entry in the shared initiative queue setting a boundary element token equal to a notation token and discarding the failed element.

15. The method as claimed in claim 14 further comprising in response to the lack of a boundary element in the shared initiative queue, identifying a notation for the boundary element.

16. The method as claimed in claim 15 further comprising in response to an identification of a notation for the boundary element, discarding the element.

17. The method as claimed in claim 16 further comprising in response to an absence of a notation for the boundary element, processing the element.

* * * * *